United States Patent
Takeuchi et al.

(10) Patent No.: US 7,311,429 B2
(45) Date of Patent: Dec. 25, 2007

(54) VEHICLE LAMP

(75) Inventors: Tetsuya Takeuchi, Hiroshima (JP);
Kunihiko Kurisu, Hiroshima (JP);
Atsushi Yoshida, Hiroshima (JP);
Hiroyuki Oshita, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 11/016,944

(22) Filed: Dec. 21, 2004

(65) Prior Publication Data

US 2005/0141231 A1   Jun. 30, 2005

(30) Foreign Application Priority Data

Dec. 26, 2003   (JP)   ............... 2003-432514

(51) Int. Cl.
*B60Q 1/04* (2006.01)
(52) U.S. Cl. ...................... 362/507; 362/538
(58) Field of Classification Search ............... 362/507, 362/538
See application file for complete search history.

(56) References Cited

U.S. PATENT DOCUMENTS

| | | | | |
|---|---|---|---|---|
| 1,351,635 A * | 8/1920 | Forsberg | ...................... | 40/556 |
| 3,759,084 A * | 9/1973 | Plewka | ........................ | 362/311 |
| 4,727,458 A | 2/1988 | Droste et al. | | |
| 4,949,226 A * | 8/1990 | Makita et al. | ............... | 362/538 |
| 6,504,477 B1 * | 1/2003 | Lin | ............................ | 340/472 |
| 6,619,829 B1 * | 9/2003 | Chen | .......................... | 362/544 |
| 6,637,922 B2 * | 10/2003 | Lee | ............................. | 362/544 |
| 2004/0218399 A1 | 11/2004 | Lin | | |

FOREIGN PATENT DOCUMENTS

| | | |
|---|---|---|
| DE | 4112194 | 10/1992 |
| DE | 20212478 | 11/2002 |
| DE | 20311688 | 9/2003 |
| EP | 1243467 | 9/2002 |
| JP | A-11-260106 | 9/1999 |

OTHER PUBLICATIONS

European Search Report for European Patent Appl. No. 04030709 (Dec. 29, 2005).
Copy of Office Action from European Patent App. No. 04030709.2 (Jan. 24, 2007).

* cited by examiner

*Primary Examiner*—Ali Alavi
*Assistant Examiner*—Hargobind S. Sawhney
(74) *Attorney, Agent, or Firm*—Cermak Kenealy & Vaidya LLP

(57) ABSTRACT

A vehicle lamp can include a sidelight source that is provided in a headlight reflector and which is close to the front end and close to the outer circumference. A position reflector can be provided that is almost in the form of a ring in an integral or split state at the front end, and close to the outer circumference of the headlight reflector to reflect light from the sidelight source toward the front in a certain direction.

18 Claims, 3 Drawing Sheets

VEHICLE LAMP

This application claims the priority benefit under 35 U.S.C. §119 of Japanese Patent Application No. 2003-432514 filed on Dec. 26, 2003, which is hereby incorporated by reference.

BACKGROUND OF THE INVENTION

1. Field of the Invention

The present invention relates to a lamp. More particularly, it relates to a vehicle lamp that can be configured to combine two lights having respective purposes, such as a headlight for illuminating a traveling path of a particular vehicle and a position lamp for indicating the existence of the particular vehicle to oncoming vehicles, pedestrians, etc., for example.

2. Description of the Related Art

A vehicle lamp, such as a headlamp 90, equipped with a position bulb 93 as shown in FIG. 6 is known in the art. The headlamp 90 includes a reflector 91 with a hole 92 formed therethrough. The position bulb 93 protrudes through the hole 92 into the lamp. The position bulb 93 is turned on if necessary, for example, at dusk to indicate the existence of a particular vehicle to other vehicles at night when the main light bulb of the headlamp 90 is not turned on.

In such a case, it is ideally preferable for the position bulb 93 to make the entire surface of the reflector 91 of the headlight 90 reflect light (be brilliant) to improve the visibility with respect to oncoming vehicles, etc. In contrast, if light from the position bulb is reflected at the reflector 91 of the headlight 90 in a way that causes an intensive upward reflected light as shown in FIG. 6, the reflected light acts undesirably, for example, by dazzling or causing glare to oncoming vehicles (see for example Japanese Patent Application No. JP-A 11-260106).

SUMMARY OF THE INVENTION

Accordingly, in a headlamp with a position bulb, the position of the hole formed through the reflector for insertion of the position bulb, and the depth and orientation of the insertion of the position bulb should be carefully considered. If these and other variables are not considered, a problem may be caused by the position light being extremely dark, casting only general non-distinct shapes, and/or being unattractive, etc.

The above and other problems in the art can be solved in various ways and via many different embodiments. For example, in accordance with an aspect of the invention, a vehicle lamp can include a headlight reflector having a front end and an outer circumference. A sidelight source can be provided in the headlight reflector at a portion located at or close to the front end and also located at or close to the outer circumference. A position reflector can be provided that is almost in the form of a ring in an integral or split state at or close to the front end of the headlight reflector. The position reflector can also be configured to reflect light from the sidelight source toward the front in a certain direction. The vehicle lamp may further include a position lens provided at a location in a direction of light reflected from the position reflector such that it can control distribution of the light reflected from the position reflector. In the vehicle lamp, the position lens may be attached at a location on or close to the front end of the headlight reflector. The headlight can take an integral or multi-part split state with respect to the position lens.

In accordance with another aspect of the invention, the sidelight source can be provided in the headlight reflector at a portion located at or close to the front end and also located at or close to the outer circumference of the headlight reflector. In addition, the position reflector can be provided such that it receives light from the sidelight source and reflects the light substantially in the form of a ring toward a location in a certain direction. Thus, when the position lamp is turned on, the portion of the headlight reflector close to the outer circumference can shine and produce light in the form of a ring, which provides a visible indication and a novel design with an outstanding effect on and improvement in the beauty of the entire vehicle.

According to yet another aspect of the invention, the vehicle lamp can include a first reflector and a first light source located in a first light source portion of the first reflector. A second light source can be provided in a second light source portion of the first reflector and can be located adjacent the outer circumference of the first reflector. The vehicle lamp can also include means for reflecting light from the second light source such that the light forms a substantially tubular ring shape about the first light source and extends in a direction away from the first and second reflectors.

BRIEF DESCRIPTION OF THE DRAWINGS

These and other features and advantages of the invention will become clear from the following description of exemplary embodiments and with reference to the accompanying drawings, wherein.

DETAILED DESCRIPTION OF PREFERRED EMBODIMENTS

Figure 1:
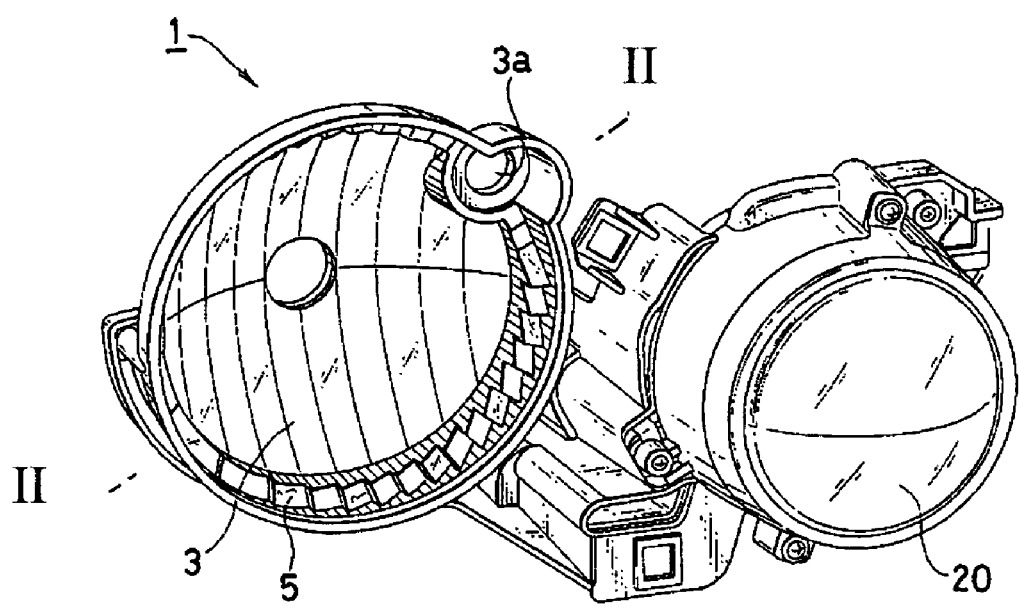
FIG. 1 is a perspective view showing an embodiment of a vehicle lamp made in accordance with the principles of the invention.

Hereinafter, description will be given of the invention with reference to the drawing figures, wherein like reference numerals designate identical or corresponding elements throughout the several figures. Incidentally, various modifications can be made without departing from the gist of the invention. It is intended that various modifications of the exemplary embodiments described herein can be made and would fall within the scope of the present invention.

The invention will now be described based on the embodiments shown in the drawings. The reference numeral 1 is employed in FIGS. 1 and 2 to denote a vehicle lamp. The vehicle lamp 1 can be formed as a headlight for use in formation of a high beam distribution. Thus, it can include a light source 2 such as a halogen bulb, discharge lamp, incandescent lamp, LED, or the like, and can include a headlight reflector 3 that reflects light from the light source 2 to form the high beam distribution.

The reference numeral 20 is employed in the figures to denote a headlight for use in formation of a low beam distribution. The headlight 20 can be formed as a so-called projector type lamp and can be configured such that it projects little or no upward light except for possibly a certain upward light directed towards the pedestrian side of the vehicle (right side in the U.S.). The specific configuration of the low beam headlight 20 is not directly related to the gist of the present invention. However, it should be understood that the principles of the invention can be incorporated into a headlight that can produce both a low beam and a high beam light, thus making unnecessary the separate low beam headlight 20 as shown in FIG. 1.

Returning again to the description of the vehicle lamp 1, an attachment hole 3a can be provided through the headlight reflector 3 at a location close to an outer circumference of the headlight reflector 3 such that a sidelight source 4 can be attached thereto. The light source 4 can be any known type of light source, such as a halogen bulb, discharge lamp, incandescent lamp, LED, or the like. A position reflector 5 can be provided in the headlight reflector 3 at a portion at or close to the front end of the headlight reflector 3. The position reflector can be shaped substantially in the form of a ring to receive light from the sidelight source 4 and to reflect the light toward a location in a certain pre-defined direction and shape.

Figure 2:
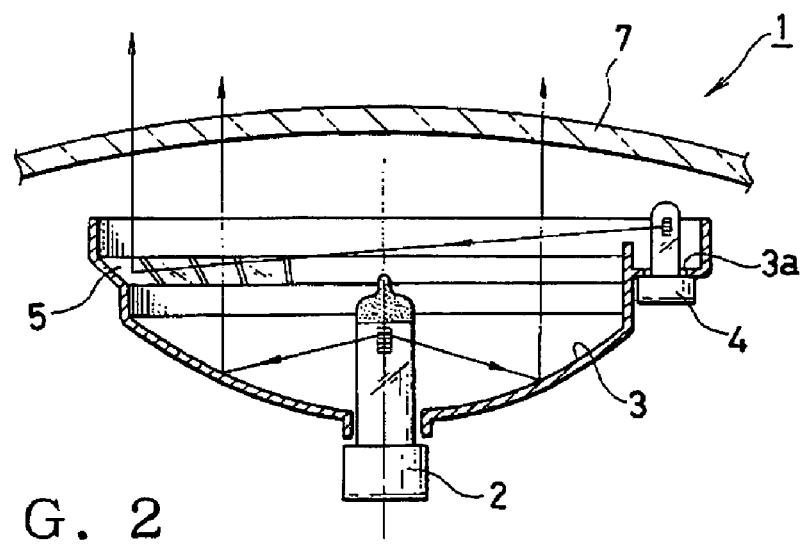
FIG. 2 is a cross-sectional view taken along line II-II in FIG. 1.

The reference numeral 7 is employed in FIG. 2 to denote an outer lens. As a trend in recent years, the design of vehicle lamps are preferably excellent in transparency. In the art, a lens-cut can be applied to the outer lens to form the light distribution for the headlight. However, in recent years, the light distribution is formed at/by the headlight reflector 3 while the outer lens 7 is allowed t remain almost plain/clear. Therefore, the light reflected from the position reflector 5 is not diffused and can be recognized from outside of the headlight after it is transmitted through the outer lens 7. Thus, the light can retain its shape determined by the position reflector 5, such as a ring.

The configuration described above may allow, when the sidelight source 4 is turned on, the light from the sidelight source 4 to reach substantially only the position reflector 5 or both the headlight reflector 3 and the position reflector 5. To define the operation of a position light (e.g., sidelight), the following description is given on the assumption that light reaches substantially only the position reflector 5.

In this embodiment, when the sidelight source 4 is turned on, the light therefrom reaches the position reflector 5, which reflects it forward from the vehicle to allow viewers to see a brilliant ring of light. The above situation can occur, for example, at dusk when the headlight source 2 has not yet been turned on. Therefore, the portion of the position reflector 5 located at the rim of the headlight reflector 3 can take the form of a brilliant ring to oncoming pedestrians, vehicles, etc. (see also FIG. 1).

If a vehicle-related regulation/specification such as a safety standard defines the color of light emitted from the sidelight (for example, light yellow, or orange), the sidelight source 4 may be provided with a colored bulb or a cover having a corresponding color to achieve a desired color of light. Of course, the color of the sidelight source 4 can also be selected as a matter of design.

Consideration is given to a situation after dusk and when the light source 2 for the headlight 1 is turned on. In this situation, when the additional light reaches the position reflector 5 from the headlight source 2 (which is usually brighter than the sidelight source 4), the light from the brighter headlight source 2 may become dominant and whiten the light reflected from the position reflector 5.

In order to avoid this situation, the position reflector 5 can be located in the headlight reflector 3 at a location at or close to the front end thereof and can be positioned more forward than the headlight source 2, as shown in FIG. 2. Thus, even when the headlight source 2 is turned on, the light therefrom can be substantially prevented from entering the position reflector 5. In addition, the light emitted from the position light source 4 can be further separated from the main light source 2 by providing a shading mechanism 31 to allow the light from the position light source to only be directed towards the position reflector.

Alternate consideration is given to a situation when light from the sidelight source 4 enters the headlight reflector 3. Before the headlight source 2 is turned on, the entire or partial surface of the headlight reflector 3 may reflect/shine light that is yellow, orange, etc. from the side light source 4. In this situation, if the side light source's brightness is not so high as to dazzle or cause glare to oncoming pedestrians, vehicles, etc., the light can be whitened without any practical trouble by turning on the headlight source 2. Therefore, it is simply a freedom of design choice to select whether or how much of the light from the sidelight source 4 can impinge on the headlight reflector 3.

When the position reflector 5 is provided close to the outer circumference of the headlight reflector 3, it can shine/radiate in a color such as orange or light yellow when the sidelight source 4 is turned on, regardless of whether the headlight is off or on. Thus, it can also serve as a sidelight as defined in the vehicle-related regulation/specification.

In the above described configuration, when the sidelight source 4 is turned on at dusk or the like, the sidelight shines in the form of, for example, a ring close to the outer circumference of the headlight reflector 3. Thus, the vehicle lamp 1 can provide a novel design for the vehicle, which hopefully improves the commodity value for the vehicle.

Figure 3:
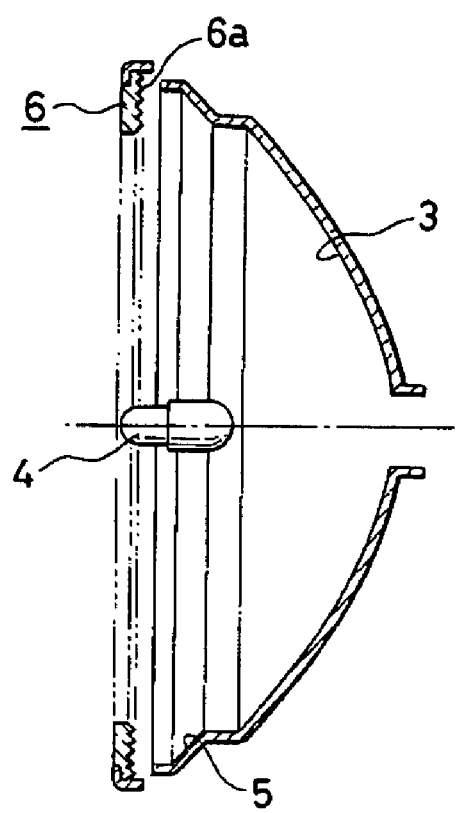
FIG. 3 is a cross-sectional view showing another embodiment of a vehicle lamp made in accordance with the principles of the invention.

FIG. 3 shows another embodiment of the vehicle lamp 1. In the previously described embodiment, the light emitted from the sidelight source 4 and reflected at the position reflector 5 can be designed to directly reach a viewer's line of sight. Therefore, when there is a difference in angle of sight, for example, there may be a difference in hue or a large variation in brightness, which can make a different impression and may not communicate/transmit the expected lighting design characteristics.

The embodiment shown in FIG. 3 is intended to solve such a problem. In this embodiment, the sidelight source 4 can be provided at an appropriate location close to the outer circumference of the headlight reflector 3, similar to the previously described embodiment. In addition, the position reflector 5 can be provided at a location suitable for receiving the light from the sidelight source 4 such that it reflects the light toward a location and in a certain direction. Further, a position lens 6 can be provided at a location adjacent the position reflector 5 such that light reflected from the position reflector 5 travels through the position lens 6. The position lens 6 can have a prism-cut 6a applied thereon, for example.

Figure 4:
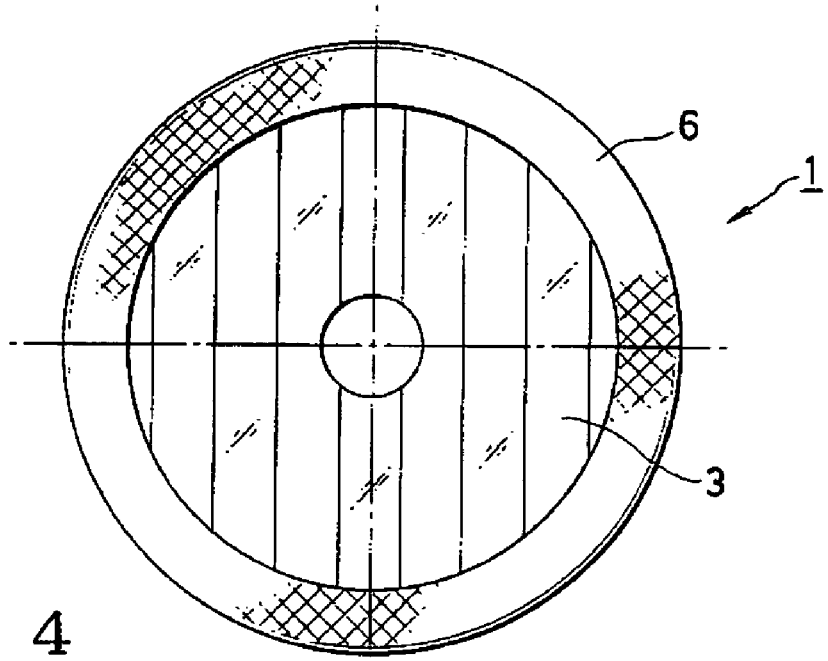
FIG. 4 is a front view of the embodiment of the vehicle lamp shown in FIG. 3.
Figure 5:
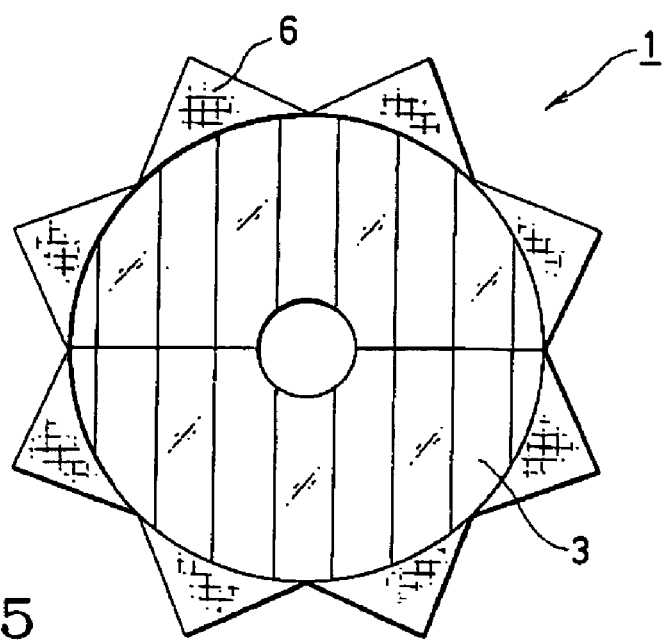
FIG. 5 is a front view showing yet another embodiment of a vehicle lamp made in accordance with the principles of the invention.
Figure 6:
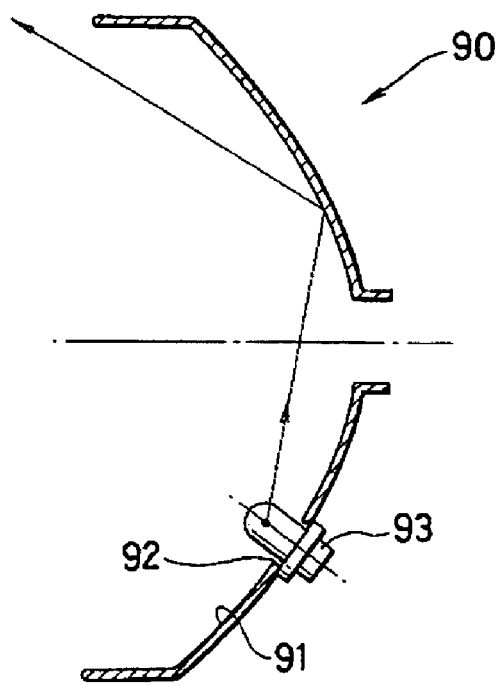
FIG. 6 is an illustrative cross-sectional view of a related art vehicle lamp and shows a malfunction in light refelection.

The position lens 6 may have a shape of an integral ring as shown in FIG. 4. Alternatively, it may have the shape of a combined ring that includes a plurality of triangles arranged along an arc, as shown in FIG. 5. In short, the position lens 6 may be configured to be present along the rim at or close to the front end of the headlight reflector 3.

The position lens 6 may be composed of a colorless transparent material. Alternatively, it may be composed of a colorful material such as a resinous material with coloration defined for the sidelight, such as light yellow, orange, etc. When the position lens 6 is not provided on the lmap, it is possible that a mixture of light from the sidelight source 4 with light from the headlight source 2 may possibly cause a deviation in color of the light that is emitted from the sidelight. To the contrary, when a position lens 6 is used and it is colored with a defined color, little or no mixture of colors occurs. Therefore, even if light leakage occurs from the headlight source 2 to the sidelight, it does not substantially effect the light characteristics of the sidelight.

The position lens 6 can also be employed to flexibly determine the shape of the side light with a wider range of design choice. The prism-cut 6a may be employed to give a uniform brightness over the surface of the lens 6 and improve the indication quality.

It should be understood that the invention is not limited by the examples/embodiments described above, in which the headlight can be provided at the front of the vehicle and be combined with the sidelight. For example, it is applicable to a combination of a taillight and a turn-signal lamp, or a combination of a back-up lamp and a turn-signal lamp, which are provided at the rear of the vehicle, or can be applied to other vehicle related, signal and/or utility lamps.

In addition, it is within the scope of the invention to include other shapes for the vehicle lamp, such as square, oval, triangular, oblong, non-symmetrical, etc. Thus, the position refelector and/or positon lens can also be differently shaped such that it can form a tubular light that is square, oval, triangular, oblong, non-symmetrical, etc., in cross-section.

Having described exemplary embodiments consistent with the invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. A vehicle lamp, comprising:
a headlight reflector having a headlight source portion, a sidelight source portion, a front end, and an outer circumference;
a sidelight source provided in the sidelight source portion of the headlight reflector, the sidelight source located adjacent the outer circumference of the headlight reflector;
a position reflector being substantially ring shaped and provided about the outer circumference of the headlight reflector and adjacent the front end of the headlight reflector such that the position reflector reflects light from the sidelight source, the headlight reflector and the position reflector being constructed from an opaque reflective material; and a position lens provided adjacent the position reflector and configured to control distribution of light that is reflected from the position reflector and directed forward from the vehicle lamp.

2. The vehicle lamp according to claim 1, wherein the position lens is attached to the vehicle lamp at a location adjacent the front end of the headlight reflector, the position lens being configured integral with the headlight reflector.

3. The vehicle lamp according to claim 1, wherein the position lens is attached to the vehicle lamp at a location adjacent the front end of the headlight reflector, the position lens being configured in a multi-part split state with respect to the headlight reflector.

4. The vehicle lamp according to claim 1, wherein the position reflector is integral with the headlight reflector.

5. The vehicle lamp according to claim 1, wherein the position reflector is separate from the headlight reflector.

6. The vehicle lamp according to claim 1, further comprising:
a headlight source located in the headlight reflector, wherein the position reflector is located at the front end of the headlight reflector such that substantially all light emitted from the headlight source is directed away from the position reflector.

7. The vehicle lamp according to claim 1, wherein the position reflector is located about an entire periphery of the outer circumference of the headlight reflector.

8. The vehicle lamp according to claim 1, wherein the position reflector includes polygonal shapes about the outer circumference of the headlight reflector.

9. A vehicle lamp, comprising:
a first reflector having a first light source portion, a second light source portion, a front end, and an outer circumference;
a first light source located in the first light source portion of the first reflector;
a second light source provided in the second light source portion of the first reflector, the second light source located adjacent the outer circumference of the first reflector;
a second reflector shaped in a ring form about the first light source and located about an exterior of the outer circumference of the first reflector as viewed from the front end of the first reflector and configured such that it causes the second light source to project light in a substantially tubular ring shape; and a lens provided adjacent the second reflector and configured to control distribution of light that is reflected from the second reflector and directed outward from the vehicle lamp..

10. The vehicle lamp according to claim 9, wherein the lens is attached to the vehicle lamp at a location adjacent the front end of the first reflector, the lens being configured integral with the first reflector.

11. The vehicle lamp according to claim 9, wherein the lens is attached to the vehicle lamp at a location adjacent the front end of the first reflector, the lens being separate from the first reflector.

12. The vehicle lamp according to claim 9, wherein the second reflector is integral with the first reflector.

13. The vehicle lamp according to claim 9, wherein the second reflector is separate from the first reflector.

14. The vehicle lamp according to claim 9, wherein the second reflector is located about an entire periphery of the outer circumference of the first reflector.

15. The vehicle lamp according to claim 9, wherein the ring form of the second reflector includes polygonal shapes about the outer circumference of the first reflector.

16. A vehicle lamp, comprising:
a first reflector having a first light source portion, a second light source portion, a front end, and an outer circumference;
a first light source located in the first light source portion of the first reflector;
a second light source provided in the second light source portion of the first reflector;
means for reflecting light from the second light source such that the light forms a substantially tubular ring shape about the first light source and extends in a direction away from the first and second reflectors; and
a position lens provided adjacent the means for reflecting light from the second light source, the position lens configured to control distribution of light that is reflected from the means for reflecting light from the second light from the second light source and that is directed forward from the vehicle lamp.

17. The vehicle lamp according to claim 16, wherein the substantially tubular ring shape of light has a non-symmetrical cross-section.

18. The vehicle lamp according to claim 16, wherein the substantially tubular ring shape of light has a cross-section that includes polygonal shapes about a periphery of the ring shape of light.

* * * * *

UNITED STATES PATENT AND TRADEMARK OFFICE
CERTIFICATE OF CORRECTION

PATENT NO. : 7,311,429 B2
APPLICATION NO. : 11/016944
DATED : December 25, 2007
INVENTOR(S) : Tetsuya Takeuchi et al.

It is certified that error appears in the above-identified patent and that said Letters Patent is hereby corrected as shown below:

Title Page, Item (73) should read as follows:

Assignee:   Stanley Electric Co., Ltd., Tokyo (JP)
            Mazda Motor Corporation, Hiroshima (JP)

Signed and Sealed this

Seventh Day of October, 2008

JON W. DUDAS
*Director of the United States Patent and Trademark Office*